United States Patent
Lewis

(10) Patent No.: US 11,630,686 B2
(45) Date of Patent: Apr. 18, 2023

(54) METHOD AND SYSTEM FOR IMPLEMENTING VIRTUAL MACHINE (VM) MANAGEMENT USING HARDWARE COMPRESSION

(71) Applicant: CenturyLink Intellectual Property, LLC, Broomfield, CO (US)

(72) Inventor: Ronald A. Lewis, Bastrop, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 17/942,589

(22) Filed: Sep. 12, 2022

(65) Prior Publication Data

US 2023/0004421 A1    Jan. 5, 2023

Related U.S. Application Data

(63) Continuation of application No. 16/119,323, filed on Aug. 31, 2018, now Pat. No. 11,442,761.

(60) Provisional application No. 62/700,740, filed on Jul. 19, 2018.

(51) Int. Cl.
    *G06F 9/455*    (2018.01)
    *G06F 9/50*     (2006.01)
    *G06F 11/34*    (2006.01)

(52) U.S. Cl.
    CPC ........ *G06F 9/45558* (2013.01); *G06F 9/5027* (2013.01); *G06F 11/3423* (2013.01); *G06F 2009/4557* (2013.01); *G06F 2009/45562* (2013.01)

(58) Field of Classification Search
    None
    See application file for complete search history.

(56) References Cited

U.S. PATENT DOCUMENTS

| | | | |
|---|---|---|---|
| 6,567,814 B1 | 5/2003 | Bankier | |
| 2010/0011178 A1* | 1/2010 | Feathergill | G06F 11/1466 711/E12.103 |
| 2012/0324446 A1 | 12/2012 | Fries | |
| 2013/0160011 A1 | 6/2013 | Corrie | |
| 2016/0162313 A1* | 6/2016 | Lemanski | H04L 63/123 718/1 |
| 2016/0224249 A1* | 8/2016 | Desai | G06F 3/0667 |
| 2018/0196816 A1 | 7/2018 | Maybee | |
| 2019/0171472 A1* | 6/2019 | Wyble | H04L 67/56 |
| 2020/0026539 A1 | 1/2020 | Lewis | |

\* cited by examiner

*Primary Examiner* — Sisley N Kim

(57) ABSTRACT

Novel tools and techniques are provided for implementing virtual machine ("VM") management, and, more particularly, to methods, systems, and apparatuses for implementing VM management using hardware compression. In various embodiments, a computing system might identify one or more first virtual machines ("VM's") among a plurality of VM's that are determined to be currently inactive and might identify one or more second VM's among the plurality of VM's that are determined to be currently active. The computing system might compress a virtual hard drive associated with each of the identified one or more first VM's that are determined to be currently inactive. The computing system might also perform or continue to perform one or more operations using each of the identified one or more second VM's that are determined to be currently active.

18 Claims, 9 Drawing Sheets

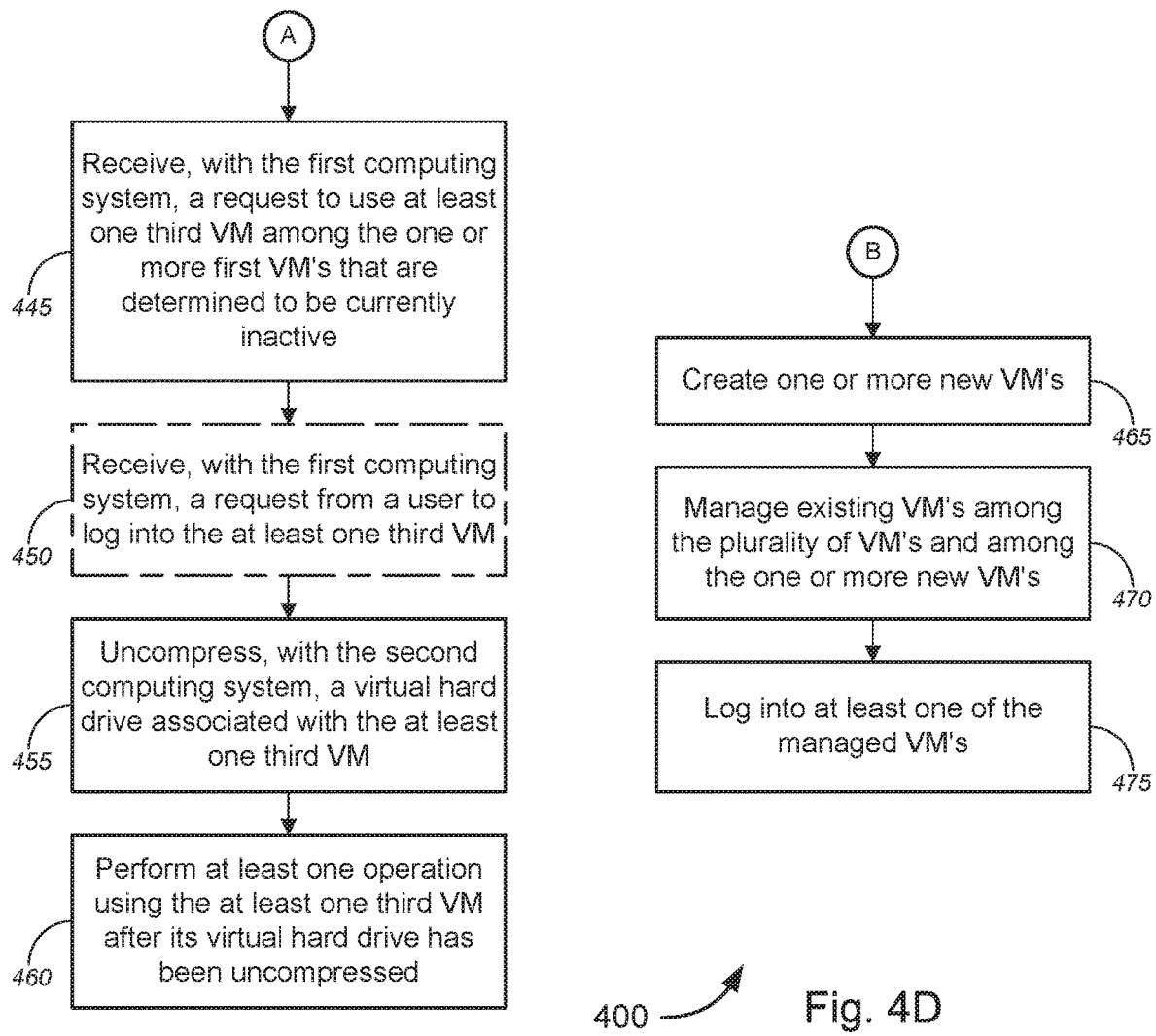

METHOD AND SYSTEM FOR IMPLEMENTING VIRTUAL MACHINE (VM) MANAGEMENT USING HARDWARE COMPRESSION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing virtual machine ("VM") management, and, more particularly, to methods, systems, and apparatuses for implementing VM management using hardware compression.

BACKGROUND

In conventional virtual machine ("VM") systems, a plurality of VM's might each comprise a virtual hard drive and one or more virtual disk files contained in the virtual hard drive. Neither the virtual hard drive nor the one or more virtual disk files contained in the virtual hard drive of such conventional VM systems are capable of being compressed (or uncompressed). Accordingly, regardless of whether VM's in the plurality of VM's in the conventional VM systems are active or inactive, each of the plurality of VM's remain unchanged in size, thereby occupying hardware space and resources. As active VM's are required to perform more and more functions, and greater and greater processes, more and more resources are required to support functioning of these active VM's. However, with resources and hardware space being occupied by inactive VM's, operation of the conventional VM systems become strained.

Hence, there is a need for more robust and scalable solutions for implementing VM management, and, more particularly, to methods, systems, and apparatuses for implementing VM management using hardware compression.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4D are flow diagrams illustrating a method for implementing VM management using hardware compression, in accordance with various embodiments.

DETAILED DESCRIPTION OF CERTAIN EMBODIMENTS

Overview

Figure 1:
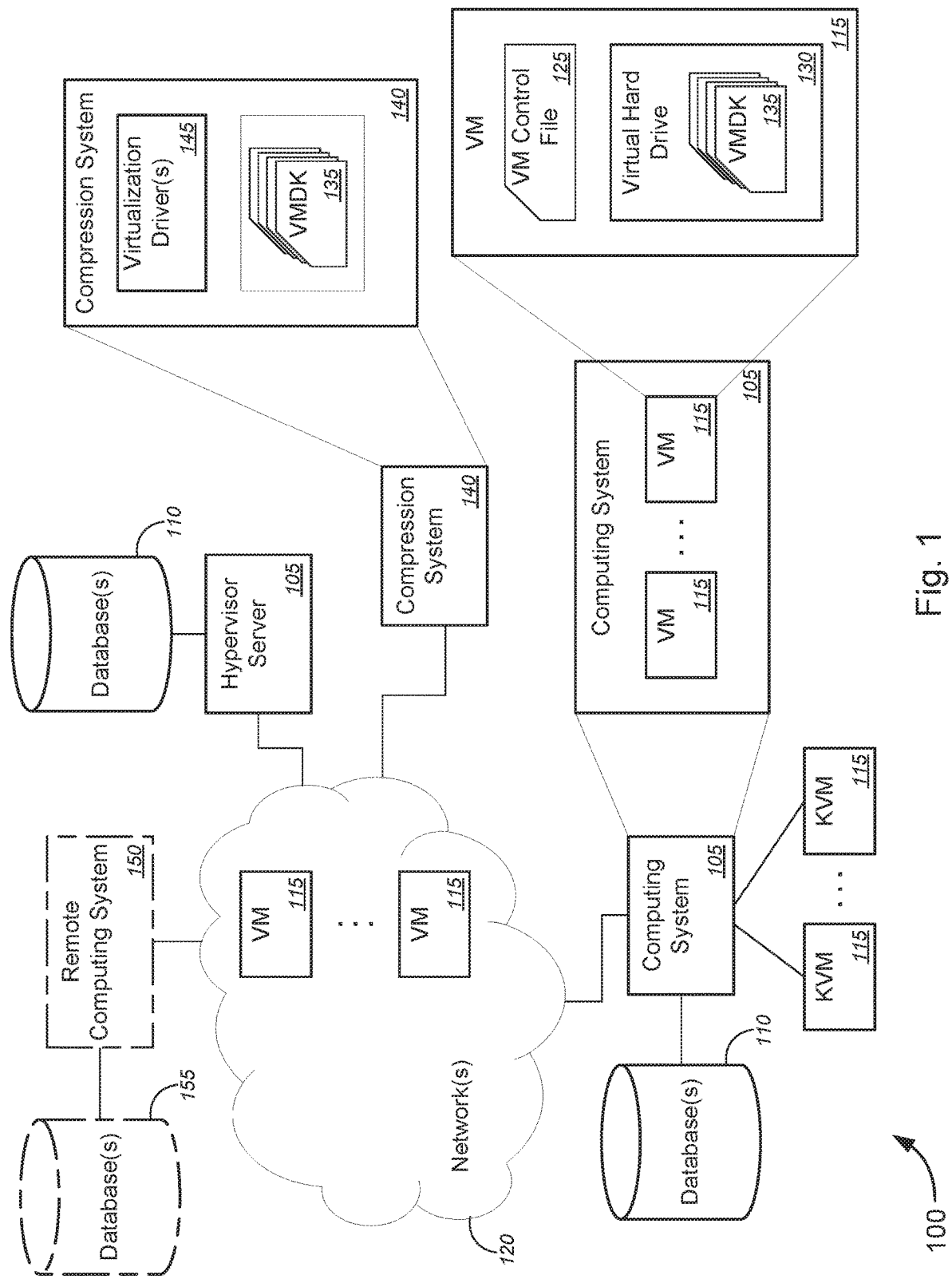
FIG. 1 is a schematic diagram illustrating a system for implementing virtual machine ("VM") management using hardware compression, in accordance with various embodiments.

Various embodiments provide tools and techniques for implementing virtual machine ("VM") management, and, more particularly, to methods, systems, and apparatuses for implementing VM management using hardware compression.

In various embodiments, a computing system might identify one or more first VM's among a plurality of VM's that are determined to be currently inactive, and might identify one or more second VM's among the plurality of VM's that are determined to be currently active. The computing system or a compression system might compress a virtual hard drive (specifically, one or more virtual disk files contained in the virtual hard drive) associated with each of the identified one or more first VM's that are determined to be currently inactive. In some cases, the computing system might perform or continue to perform one or more (computing) operations using each of the identified one or more second VM's that are determined to be currently active.

According to some embodiments, compressing the virtual hard drive associated with each of the identified one or more first VM's might comprise performing high-speed compression on the virtual hard drive associated with each of the identified one or more first VM's that are determined to be currently inactive. In some cases, the compression system or the computing system might compress the virtual hard drive (specifically, the one or more virtual disk files contained in the virtual hard drive) at a rate of 100-500 Mb/s compression, a rate of 500-1000 Mb/s compression, a rate of 1-15 Gb/s compression, a rate of 15-20 Gb/s compression, or greater.

Alternatively, or additionally, compressing the virtual hard drive associated with each of the identified one or more first VM's might comprise compressing the virtual hard drive associated with each of the identified one or more first VM's by at least 60%, such that each of the identified one or more first VM's is compressed to 40% or less of its original size. In some cases, compressing the virtual hard drive associated with each of the identified one or more first VM's might comprise compressing the virtual hard drive associated with each of the identified one or more first VM's by at least 70%, such that each of the identified one or more first VM's is compressed to 30% or less of its original size. Alternatively, or additionally, compressing the virtual hard drive associated with each of the identified one or more first VM's might comprise compressing one or more virtual machine disk files associated with each of the identified one or more first VM's using at least one VM control file associated with at least one first VM.

In some embodiments, the computing system might receive a request to use at least one third VM among the one or more first VM's that are determined to be currently inactive. In some instances, receiving the request to use the at least one third VM might comprise receiving a request from a user to log into the at least one third VM. The compression system or the computing system might uncompress a virtual hard drive (specifically, one or more virtual disk files of the virtual hard drive) associated with the at least one third VM. In some cases, the computing system might perform or continue to perform at least one (computing) operation using the at least one third VM after its virtual hard drive (specifically, the one or more virtual disk files contained in the virtual hard drive) has been uncompressed.

By using the hardware compression for VM management, as described herein, the system may be leveraged to compress virtual hard drives (i.e., the virtual disk files contained in the virtual hard drives) associated with VM's that are not currently in use (i.e., inactive), and only uncompresses virtual hard drives (i.e., the virtual disk files contained in the virtual hard drives) associated with VM's that are in use (or requested to be used). In this manner, hardware resources and hardware space may be utilized more efficiently, by releasing resources and space by the compression of inactive VM's (thereby avoiding needless occupation of resources and space by inactive VM's; with only the compressed virtual hard drive and uncompressible portions of the inactive VM's being stored).

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, virtual machine ("VM") technology, VM management technology, and/or the like. In other aspects, certain embodiments can improve the functioning of user equipment or systems themselves (e.g., VM systems, VM management systems, etc.), for example, by identifying, with a first computing system, one or more first VM's among a plurality of VM's that are determined to be currently inactive; identifying, with the first computing system, one or more second VM's among the plurality of VM's that are determined to be currently active; compressing, with a second computing system, a virtual hard drive associated with each of the identified one or more first VM's that are determined to be currently inactive; and performing or continuing to perform one or more operations using each of the identified one or more second VM's that are determined to be currently active; and/or the like. In particular, to the extent any abstract concepts are present in the various embodiments, those concepts can be implemented as described herein by devices, software, systems, and methods that involve specific novel functionality (e.g., steps or operations), such as, compressing virtual hard drives (or virtual disk files contained in virtual hard drives) of VM's that are deemed or determined to be inactive, while uncompressing virtual hard drives (or virtual disk files contained in virtual hard drives) of VM's that are deemed or determined to be active (or in use or requested to be used), and/or the like, to name a few examples, that extend beyond mere conventional computer processing operations. These functionalities can produce tangible results outside of the implementing computer system, including, merely by way of example, optimized and efficient use of VM systems or VM management systems, or optimized and efficient use of hardware resources or space in VM systems, and/or the like, at least some of which may be observed or measured by users, programmers, or service providers.

In an aspect, a method might comprise identifying, with a first computing system, one or more first virtual machines ("VM's") among a plurality of VM's that are determined to be currently inactive; and identifying, with the first computing system, one or more second VM's among the plurality of VM's that are determined to be currently active. The method might also comprise compressing, with a second computing system, a virtual hard drive associated with each of the identified one or more first VM's that are determined to be currently inactive. The method might further comprise performing or continuing to perform one or more operations using each of the identified one or more second VM's that are determined to be currently active.

In some embodiments, the first computing system might comprise at least one of a hypervisor, a kernel-based VM server, a blade server, a central processing unit ("CPU"), a virtual processor, or a VM manager, and/or the like. The second computing system might comprise at least one of a hypervisor, a compression processor, a compression computing system, a hardware compression board, a virtual processor, a graphic processing unit ("GPU")-based system, or a GPU-based board, and/or the like. In some cases, the first computing system and the second computing system might be the same computing system.

According to some embodiments, compressing the virtual hard drive associated with each of the identified one or more first VM's might comprise performing, with the second computing system, high-speed compression on the virtual hard drive associated with each of the identified one or more first VM's that are determined to be currently inactive. Alternatively, or additionally, compressing the virtual hard drive associated with each of the identified one or more first VM's might comprise compressing the virtual hard drive associated with each of the identified one or more first VM's by at least 60%, such that each of the identified one or more first VM's is compressed to 40% or less of its original size. In some instances, compressing the virtual hard drive associated with each of the identified one or more first VM's might comprise compressing the virtual hard drive associated with each of the identified one or more first VM's by at least 70%, such that each of the identified one or more first VM's is compressed to 30% or less of its original size. Alternatively, or additionally, compressing the virtual hard drive associated with each of the identified one or more first VM's might comprise compressing one or more virtual machine disk files associated with each of the identified one or more first VM's using at least one VM control file associated with at least one first VM.

In some embodiments, the method might further comprise receiving, with the first computing system, a request to use at least one third VM among the one or more first VM's that are determined to be currently inactive; uncompressing, with the second computing system, a virtual hard drive associated with the at least one third VM; and performing at least one operation using the at least one third VM after its virtual hard drive has been uncompressed. In some cases, receiving the request to use the at least one third VM might comprise receiving, with the first computing system, a request from a user to log into the at least one third VM.

According to some embodiments, the method might further comprise creating one or more new VM's; managing existing VM's among the plurality of VM's and among the one or more new VM's; and logging into at least one of the managed VM's.

In another aspect, a system might comprise a first computing system and a second computing system. The first computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first computing system to: identify one or more first virtual machines ("VM's") among a plurality of VM's that are determined to be currently inactive; and identify one or more second VM's among the plurality of VM's that are determined to be currently active. The second computing system might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the second computing system to: compress a virtual hard drive associated with each of the identified one or more first VM's that are determined to be currently inactive. The first set of instructions, when executed by the at least one first processor, further causes the first computing system to: perform or continue to perform one or more operations using each of the identified one or more second VM's that are determined to be currently active.

In some embodiments, the first computing system might comprise at least one of a hypervisor, a kernel-based VM server, a blade server, a central processing unit ("CPU"), a virtual processor, or a VM manager, and/or the like. The second computing system might comprise at least one of a hypervisor, a compression processor, a compression computing system, a hardware compression board, a virtual processor, a graphic processing unit ("GPU")-based system, or a GPU-based board, and/or the like. In some cases, the first computing system and the second computing system might be the same computing system.

According to some embodiments, compressing the virtual hard drive associated with each of the identified one or more first VM's might comprise performing high-speed compression on the virtual hard drive associated with each of the identified one or more first VM's that are determined to be currently inactive. Alternatively, or additionally, compressing the virtual hard drive associated with each of the identified one or more first VM's might comprise compressing one or more virtual machine disk files associated with each of the identified one or more first VM's using at least one VM control file associated with at least one first VM.

In some embodiments, the first set of instructions, when executed by the at least one first processor, further causes the first computing system to receive a request to use at least one third VM among the one or more first VM's that are determined to be currently inactive. The second set of instructions, when executed by the at least one second processor, further causes the second computing system to uncompress a virtual hard drive associated with the at least one third VM. The first set of instructions, when executed by the at least one first processor, further causes the first computing system to perform at least one operation using the at least one third VM after its virtual hard drive has been uncompressed. In some cases, receiving the request to use the at least one third VM might comprise receiving a request from a user to log into the at least one third VM.

In yet another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: identify one or more first virtual machines ("VM's") among a plurality of VM's that are determined to be currently inactive; identify one or more second VM's among the plurality of VM's that are determined to be currently active; compress a virtual hard drive associated with each of the identified one or more first VM's that are determined to be currently inactive; and perform or continue to perform one or more operations using each of the identified one or more second VM's that are determined to be currently active.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing virtual machine ("VM") management, and, more particularly, to methods, systems, and apparatuses for implementing VM management using hardware compression, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing virtual machine ("VM") management using hardware compression, in accordance with various embodiments.

In the non-limiting embodiment of FIG. 1, system 100 might comprise a computing system or hypervisor server 105 (referred to hereafter as either "computing system 105" or "hypervisor server 105," or the like) and corresponding database(s) 110. In some embodiments, the computing system 105 might include, without limitation, at least one of a hypervisor, a kernel-based VM server, a blade server, a central processing unit ("CPU"), a virtual processor, or a VM manager a compression processor, a compression computing system, a hardware compression board, a graphic processing unit ("GPU")-based system, or a GPU-based board, and/or the like. System 100 might further comprise a plurality of VM's 115, which may be disposed (or hosted) within computing system 105, disposed external to (yet communicatively coupled with) computing system 105, disposed within network(s) 120 with which computing system 105 is in communication (either wirelessly or in a wired manner), and/or the like. In some instances, the computing system or hypervisor server 105 might manage VM's. In some cases, the hypervisor server 105 might be a server that runs a hypervisor(s) that provides the ability to carve up hardware resources (e.g., CPU cores, processing memory (e.g., RAM), physical storage (hard drive space), and/or the like).

According to some embodiments, one or more of the plurality of VM's might comprise kernel-based VM's ("KVM's"), or the like. According to some embodiments, each of at least one VM 115 among the plurality of VM's 115 might comprise a VM control file 125 (e.g., a .vmx file, or the like) and a virtual hard drive 130. In some cases, the VM control file 125 might be a primary configuration or control file that stores one or more settings for the VM (which may be based on input by a user, or may be based on default settings, or the like), while the virtual hard drive 130 might comprise one or more virtual disk files 135 (e.g., one or more .vmdk files, or the like) that store contents of the VM's hard drive 130. In some embodiments, the one or more virtual disk files 135 (e.g., the one or more .vmdk files, or the like) might each comprise an image of a VM associated therewith.

System 100 might further comprise a compression system 140, which might include, but is not limited to, at least one of a hypervisor, a compression processor, a compression computing system, a hardware compression board, a virtual processor, a graphic processing unit ("GPU")-based system, or a GPU-based board, and/or the like. In some embodiments, the computing system 105 and the compression system 140 might be embodied in the same computing system, or the like. In some instances, the compression system 140 might provide high-speed compression (or high-speed uncompression), which might offload compression (or uncompression) workload from at least one central processing unit ("CPU") of the computing system 105 or the hypervisor server. In some cases, a virtualization driver(s) 145 (which might be disposed and installed on the compression system 140, or might be disposed and installed on another computer hardware or the like) might be configured to route disk input/output ("I/O") through the compression system 140. According to some embodiments, system 100 might further comprise remote computing system 150 (optional) and corresponding database(s) 155 (optional), which might perform functions similar to computing system 105 or hypervisor server 105, while being remotely located relatively to the plurality of VM's 115 and being communicatively coupled to the VM's 115 via network(s) 120.

Figure 3A:
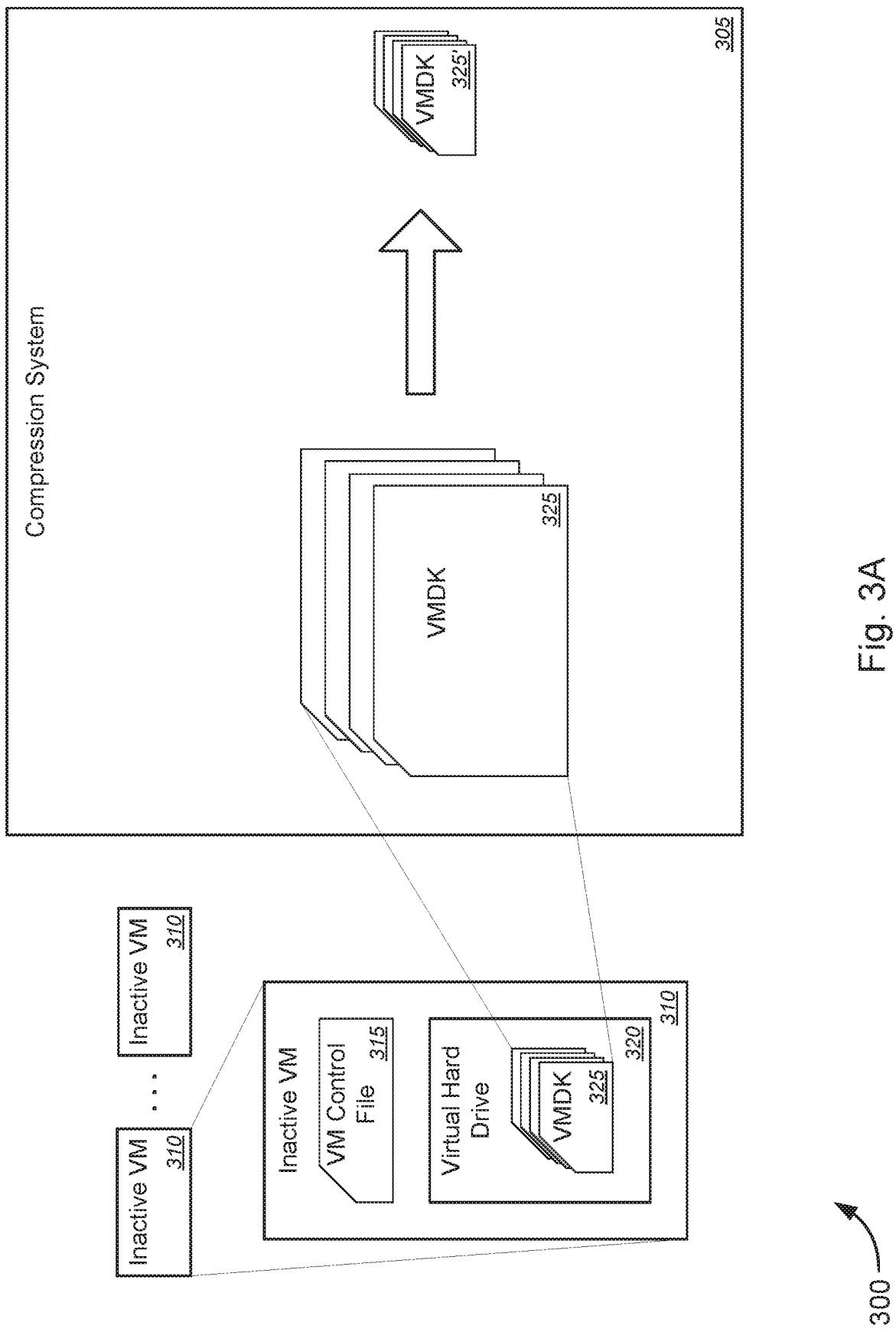
FIG. 3A is a schematic diagram illustrating a non-limiting example of compression of virtual hard drives of inactive VM's, in accordance with the various embodiments.

In operation, the computing system (or hypervisor server) 105 might identify one or more first VM's 115a (not shown in FIG. 1) among the plurality of VM's 115 that are determined to be currently inactive, and might identify one or more second VM's 115b (not shown in FIG. 1) among the plurality of VM's 115 that are determined to be currently active. The compression system 140 (or computing system or hypervisor server 105) might compress the virtual hard drive 130 (specifically, one or more virtual disk files 135 of the virtual hard drive 130) associated with each of the identified one or more first VM's that are determined to be currently inactive (as depicted in FIG. 3A, or the like). In some cases, the computing system (or hypervisor server) 105 (or another computing system) might perform or continue to perform one or more (computing) operations using each of the identified one or more second VM's 115b that are determined to be currently active.

According to some embodiments, compressing the virtual hard drive 130 associated with each of the identified one or more first VM's 115a might comprise performing high-speed compression on the virtual hard drive 130 associated with each of the identified one or more first VM's 115a that are determined to be currently inactive. In some cases, the compression system 140 (or computing system or hypervisor server 105) might compress the virtual hard drive 130 (specifically, the one or more virtual disk files 135 of the virtual hard drive 130) at a rate of 100-500 Mb/s compression, a rate of 500-1000 Mb/s compression, a rate of 1-15 Gb/s compression, a rate of 15-20 Gb/s compression, or greater.

Alternatively, or additionally, compressing the virtual hard drive 130 associated with each of the identified one or more first VM's 115a might comprise compressing the virtual hard drive 130 associated with each of the identified one or more first VM's 115a by at least 60%, such that each of the identified one or more first VM's 115a is compressed to 40% or less of its original size. Herein and throughout this disclosure, "original size" refers to the size of the virtual hard drive prior to compression. In some cases, compressing the virtual hard drive 130 associated with each of the identified one or more first VM's 115a might comprise compressing the virtual hard drive 130 associated with each of the identified one or more first VM's 115a by at least 70%, such that each of the identified one or more first VM's 115a is compressed to 30% or less of its original size. Alternatively, or additionally, compressing the virtual hard drive 130 associated with each of the identified one or more first VM's 115a might comprise compressing one or more virtual machine disk files 135 associated with each of the identified one or more first 115a VM's using at least one VM control file 125 associated with at least one first VM 115a.

Figure 3B:
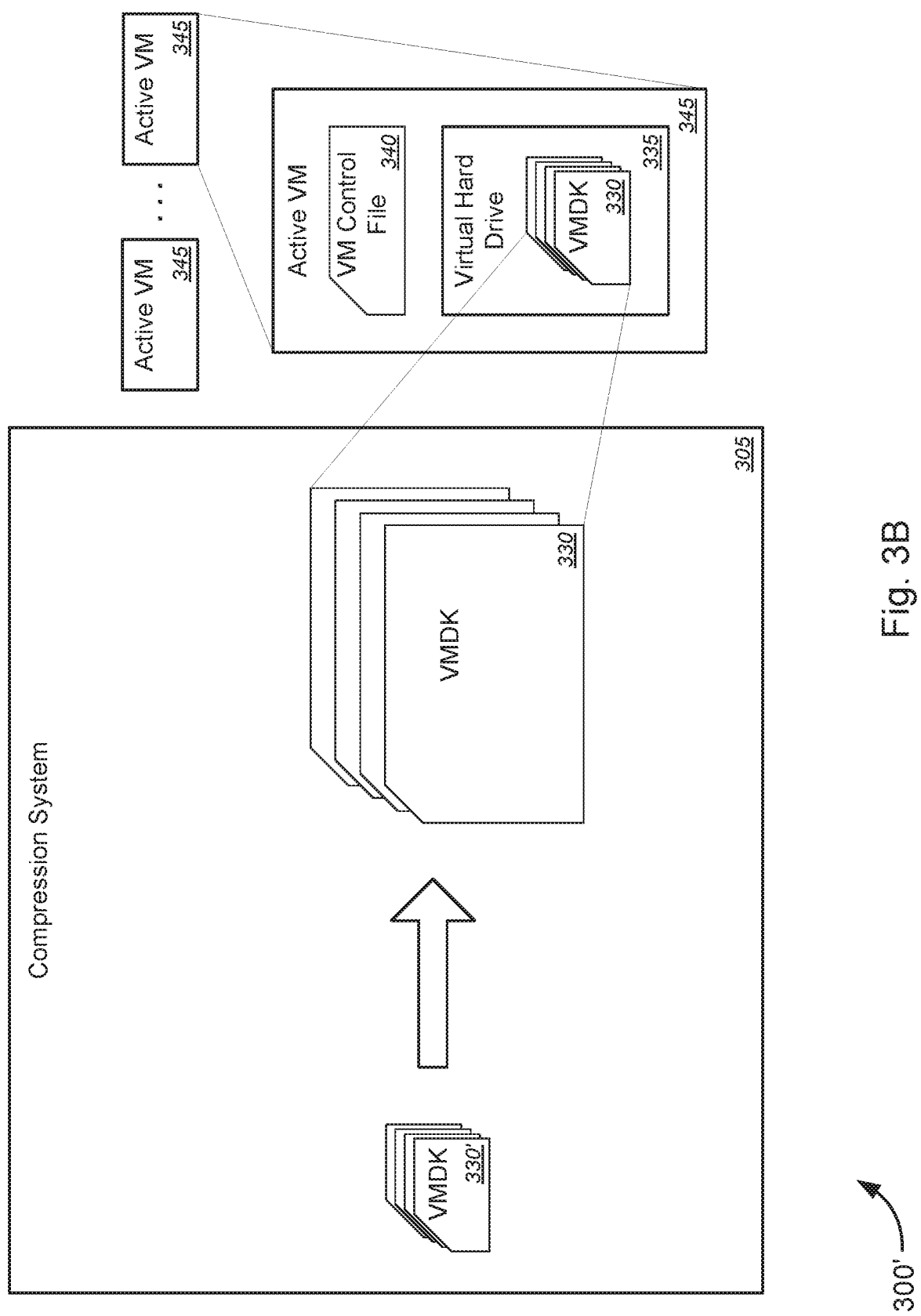
FIG. 3B is a schematic diagram illustrating a non-limiting example of uncompression of virtual hard drives of active VM's that were formerly inactive, in accordance with the various embodiments.

In some embodiments, the computing system (or hypervisor server) 105 might receive a request to use at least one third VM 115c (not shown) among the one or more first VM's 115a that are determined to be currently inactive. In some instances, receiving the request to use the at least one third VM 115c might comprise receiving a request from a user to log into the at least one third VM 115c. The compression system 140 (or computing system or hypervisor server 105) might uncompress a virtual hard drive 130 (specifically, one or more virtual disk files 135 of the virtual hard drive 130) associated with the at least one third VM 115*c* (as depicted in FIG. 3B, or the like). In some cases, the computing system (or hypervisor server) 105 (or another computing system) might perform at least one (computing) operation using the at least one third VM 115*c* after its virtual hard drive 130 (specifically, the one or more virtual disk files 135 of the virtual hard drive 130) has been uncompressed, thereby turning each of the at least one third VM 115*c* into an active VM.

Merely by way of example, according to some embodiments, the computing system (or hypervisor server) 105 might create one or more new VM's 115*d* (not shown), might manage existing VM's 115*a*-115*c* among the plurality of VM's 115 and among the one or more new VM's 115*d*, and might log into (or provide a user to log into) at least one of the managed VM's.

These and other aspects of the various embodiments are described in detail below with respect to FIGS. 2-4.

Figure 2:
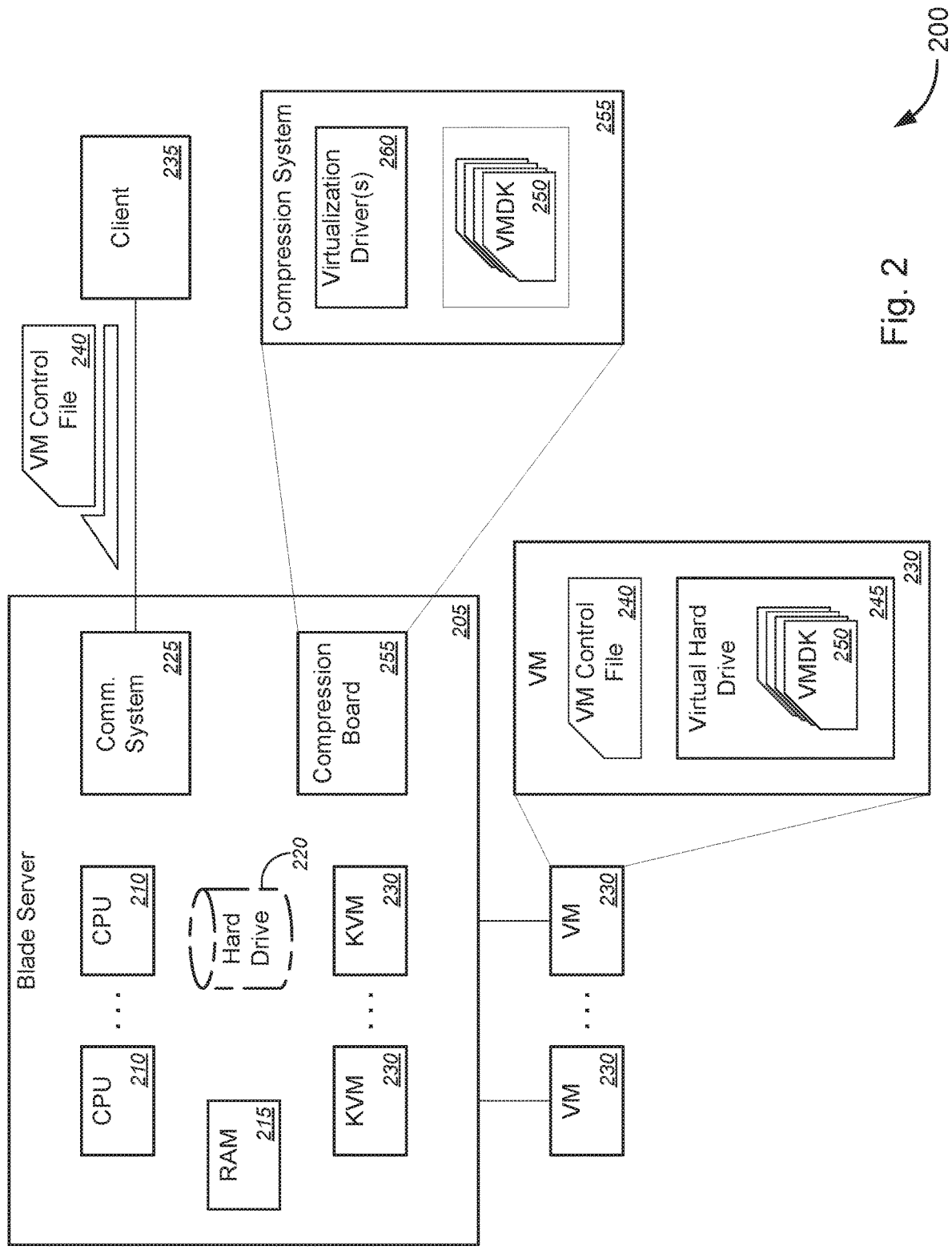
FIG. 2 is a schematic diagram illustrating another system for implementing VM management using hardware compression, in accordance with various embodiments.

FIG. 2 is a schematic diagram illustrating another system 200 for implementing VM management using hardware compression, in accordance with various embodiments.

In the non-limiting embodiment of FIG. 2, system 200 might comprise a blade server 205 (which, in some cases, might comprise a hypervisor server (such as hypervisor server 105 of FIG. 1 or the like) or a computing system (such as computing system 105 or remote computing system 150 of FIG. 1, or the like)). In some embodiments, the blade server 205 might comprise one or more central processing units ("CPU's") 210, random access memory ("RAM"; which can be programmable, flash-updateable, and/or the like) 215, hard drive 220 (optional), communications system 225 (which might include at least one of one or more wireless transceivers, one or more wired communications devices, and/or the like), one or more virtual machines ("VM's") 230, and/or the like. The one or more VM's 230 may be disposed (or hosted) within blade server 205, disposed external to (yet communicatively coupled, via communications system 225, with) blade server 205, and/or the like. In some cases, at least one of the one or more VM's 230 might comprise kernel-based VM's ("KVM's"), or the like (and may be as shown in FIG. 2, or may be different from the non-limiting example as shown in FIG. 2). In some instances, system 200 might further comprise a client 235, which might communicatively couple to communications system 225. In some instances, client 235 might comprise a VM, a CPU, a hypervisor, or another computing system, and/or the like.

According to some embodiments, each of at least one VM among the one or more VM's 230 might comprise a VM control file 240 (e.g., a .vmx file, or the like) and a virtual hard drive 245. In some cases, the VM control file 240 might be a primary configuration or control file that stores one or more settings for the VM (which may be based on input by a user, or may be based on default settings, or the like), while the virtual hard drive 245 might comprise one or more virtual disk files 250 (e.g., one or more .vmdk files, or the like) that store contents of the VM's hard drive 245. In some embodiments, the one or more virtual disk files 250 (e.g., the one or more .vmdk files, or the like) might each comprise an image of a VM associated therewith.

System 200 might further comprise a compression system or compression board 255, which might include, but is not limited to, at least one of a hypervisor, a compression processor, a compression computing system, a hardware compression board, a virtual processor, a graphic processing unit ("GPU")-based system, or a GPU-based board, and/or the like. In some embodiments, the blade server 205 (or CPU's 210) and the compression system 255 might be embodied in the same computing system, or the like. In some instances, the compression system 255 might provide high-speed compression (or high-speed uncompression), which might offload compression (or uncompression) workload from at least one central processing unit ("CPU") of the blade server 205 (or CPU's 210) or the hypervisor server. In some cases, a virtualization driver(s) 260 (which might be disposed and installed on the compression system 255, or might be disposed and installed on another computer hardware or the like) might be configured to route disk input/output ("I/O") through the compression system 255. Although not shown, a high-speed bus (e.g., a PCIe bus, or the like) might be disposed within blade server 205 to provide high velocity bi-directional data transfer or data streaming capability, or the like.

In operation, at least one CPU 210 (or the client 235) might identify one or more first VM's 230*a* (not shown in FIG. 2) among the one or more VM's 230 that are determined to be currently inactive, and might identify one or more second VM's 230*b* (not shown in FIG. 2) among the one or more VM's 230 that are determined to be currently active. The compression system 255 (or the at least one CPU 210 or client 235) might compress the virtual hard drive 245 (specifically, one or more virtual disk files 250 of the virtual hard drive 245) associated with each of the identified one or more first VM's that are determined to be currently inactive (as depicted in FIG. 3A, or the like). In some cases, at least one CPU 210 (or the client 235) (or another computing system) might perform or continue to perform one or more (computing) operations using each of the identified one or more second VM's 230*b* that are determined to be currently active.

According to some embodiments, compressing the virtual hard drive 245 associated with each of the identified one or more first VM's 230*a* might comprise performing high-speed compression on the virtual hard drive 245 associated with each of the identified one or more first VM's 230*a* that are determined to be currently inactive. In some cases, the compression system 255 (or the at least one CPU 210 or client 235) might compress the virtual hard drive 245 (specifically, the one or more virtual disk files 250 of the virtual hard drive 245) at a rate of 100-500 Mb/s compression, a rate of 500-1000 Mb/s compression, a rate of 1-15 Gb/s compression, a rate of 15-20 Gb/s compression, or greater.

Alternatively, or additionally, compressing the virtual hard drive 245 associated with each of the identified one or more first VM's 230*a* might comprise compressing the virtual hard drive 245 associated with each of the identified one or more first VM's 230*a* by at least 60%, such that each of the identified one or more first VM's 230*a* is compressed to 40% or less of its original size. In some cases, compressing the virtual hard drive 245 associated with each of the identified one or more first VM's 230*a* might comprise compressing the virtual hard drive 245 associated with each of the identified one or more first VM's 230*a* by at least 70%, such that each of the identified one or more first VM's 230*a* is compressed to 30% or less of its original size. Alternatively, or additionally, compressing the virtual hard drive 245 associated with each of the identified one or more first VM's 230*a* might comprise compressing one or more virtual machine disk files 250 associated with each of the identified one or more first 230*a* VM's using at least one VM control file 240 associated with at least one first VM 230*a*.

In some embodiments, at least one CPU 210 (or the client 235) might receive a request to use at least one third VM 230*c* (not shown) among the one or more first VM's 230*a* that are determined to be currently inactive. In some instances, receiving the request to use the at least one third VM 230c might comprise receiving a request from a user to log into the at least one third VM 230c. In some cases, the client 235 (or another computing system) might send a VM control file 240 to the CPU 210 or the compression board 255. The compression system 255 (or the at least one CPU 210 or client 235) might uncompress a virtual hard drive 245 (specifically, one or more virtual disk files 250 of the virtual hard drive 245) associated with the at least one third VM 230c (as depicted in FIG. 3B, or the like), in some cases, based at least in part on the VM control file 240, or the like. In some cases, at least one CPU 210 (or the client 235) (or another computing system) might perform at least one (computing) operation using the at least one third VM 230c after its virtual hard drive 245 (specifically, the one or more virtual disk files 250 of the virtual hard drive 245) has been uncompressed. By performing the at least one (computing) operation using the at least one third VM 230c, the at least one third VM 230c transitions from being inactive to active.

Merely by way of example, according to some embodiments, at least one CPU 210 (or the client 235) might create one or more new VM's 230d (not shown), might manage existing VM's 230a-230c among the one or more VM's 230 and among the one or more new VM's 230d, and might log into (or provide a user to log into) at least one of the managed VM's.

These and other aspects of the various embodiments are described in detail below with respect to FIGS. 3A, 3B, and 4.

FIGS. 3A and 3B (collectively, "FIG. 3") depict non-limiting examples of compression and uncompression, respectively, of virtual hard drives of VM's, in accordance with the various embodiments. FIG. 3A is a schematic diagram illustrating a non-limiting example 300 of compression of virtual hard drives of inactive VM's, in accordance with the various embodiments. FIG. 3B is a schematic diagram illustrating a non-limiting example 300' of uncompression of virtual hard drives of active VM's that were formerly inactive, in accordance with the various embodiments.

In the non-limiting example 300 of FIG. 3A, compression system 305 (which might correspond to compression system 140 or 255 of FIG. 1 or 2, or the like) might compress a plurality of VM's 310 that have been identified as being (or have been determined to be) inactive (as described in detail above with respect to FIGS. 1 and 2, or the like). According to some embodiments, the compression system 305 might include, but is not limited to, at least one of a hypervisor, a compression processor, a compression computing system, a hardware compression board, a virtual processor, a graphic processing unit ("GPU")-based system, or a GPU-based board, and/or the like. Each inactive VM 310 might comprise a VM control file 315 (e.g., a .vmx file, or the like) and a virtual hard drive 320. In some cases, the VM control file 315 might be a primary configuration or control file that stores one or more settings for the VM (which may be based on input by a user, or may be based on default settings, or the like), while the virtual hard drive 320 might comprise one or more virtual disk files 325 (e.g., one or more .vmdk files, or the like) that store contents of the VM's hard drive 320, resulting in compressed virtual disk files 325' (e.g., compressed .vmdk files, or the like). In some embodiments, the one or more virtual disk files 325 (e.g., the one or more .vmdk files, or the like) might each comprise an image of a VM associated therewith.

In some embodiments, the compression system 305 might compress the virtual disk files 325 (e.g., the .vmdk files, or the like) by at least 60% (thereby reducing the size of these files to 40% or less of their original sizes), in some cases, by at least 70% (thereby reducing the size of these files to 30% or less of their original sizes). In a non-limiting example, a virtual hard drive having an original size of 4 GB was reduced in size to about 1.3 GB when the virtual disk files (e.g., .vmdk files) that are contained in the virtual hard drive 320 were compressed using the techniques described herein. In some instances, the compression system 305 might perform high-speed compression on the virtual hard drive (specifically, on the virtual disk files or the .vmdk files 325), in some cases, achieving a compression rate of 100-500 Mb/s, 500-1000 Mb/s, 1-15 Gb/s, 15-20 Gb/s, or greater. According to some embodiments, compression of the virtual hard drives 320 or the virtual disk files 325 might be performed using the corresponding VM control file(s) 315 associated with the virtual hard drives 320 or the virtual disk files 325.

With reference to FIG. 3B, and referring to the non-limiting example 300', previously inactive VM's (such as inactive VM's 310 of FIG. 3, or the like), after becoming active (e.g., in response to receiving a request to use such previously inactive VM's, in response to receiving a request from a user to log into such previously inactive VM's, in response to a computing system spinning up or activating such previously inactive VM's, and/or the like), may be uncompressed by compression system 305. In particular, the compression system 305 (which might be the same compression system as compression system 305 of FIG. 3A, or the like) might uncompress one or more compressed virtual disk files 330' (e.g., one or more compressed .vmdk files, or the like), resulting in uncompressed virtual disk files 330 (e.g., uncompressed .vmdk files, or the like). Like virtual disk files 325 (or .vmdk files 325, or the like), the one or more compressed virtual disk files 330' (e.g., one or more compressed .vmdk files, or the like) might each comprise an image of a VM associated therewith.

In some embodiments, the compression system 305 might uncompress the virtual disk files 330' (e.g., the .vmdk files, or the like) by at least 142% (thereby restoring these files from a size of 30% or less of their original sizes back to 100% of their original sizes), in some cases, by at least 166% (thereby restoring these files from a size of 40% or less of their original sizes back to 100% of their original sizes). In the non-limiting example above regarding the virtual hard drive having an original size of 4 GB having been reduced in size to about 1.3 GB when the virtual disk files (e.g., .vmdk files) that are contained in the virtual hard drive were compressed using the techniques described herein, the compression system 305 might uncompress the virtual disk files (e.g., .vmdk files) back to their original size of 4 GB. When uncompressed, the VM, which contains the virtual hard drive whose virtual disk files (e.g., vmdk files) have been uncompressed back to their original size, may be executed normally without adverse effect(s) to the VM. In some instances, the compression system 305 might perform high-speed uncompression on the virtual hard drive 335 (specifically, on the virtual disk files or the .vmdk files 330'), in some cases, achieving a uncompression rate of 100-500 Mb/s, 500-1000 Mb/s, 1-15 Gb/s, 15-20 Gb/s, or greater. According to some embodiments, uncompression of the virtual hard drives 335 or the virtual disk files 330 might be performed using the corresponding VM control file(s) 340 associated with the virtual hard drives 335 or the virtual disk files 330, thereby activating VM's 345.

In another non-limiting embodiment, most virtual machines in the inventory of a company might be virtual desktops. Each such VM might have a virtual hard drive that is nothing more than a binary file, which might range in size. In some cases, virtual desktop image operating system ("OS") might range in size (uncompressed) from about 4 GB to 160 GB. A programmer might have written scripts to invoke the compression board to compress/uncompress the logical volumes during the shut down and initialization processes, respectively. In some non-limiting embodiments, one might see nearly a 75% collapse in file size once compressed after shutdown. In some instances, a virtual desktop image ("VDI") environment might be configured for a "follow the sun" feature, which allows one set of users around the globe to use a first set of VM's during the day in their time zone, then allows the first set of VM's to be compressed (i.e., to have their virtual hard drives or virtual disk files to be compressed), thereby freeing hardware space and resources for a second set of VM's to be uncompressed (i.e., to have their virtual hard drives or virtual disk files to be uncompressed) and used by a second set of users in a different time zone. In this manner, the reduction in the overall storage requirements may be leveraged by 30-40%—that is, leveraging a system that compresses virtual hard drives (i.e., the virtual disk files contained in the virtual hard drives) associated with VM's that are not currently in use (i.e., inactive), and only uncompresses virtual hard drives (i.e., the virtual disk files contained in the virtual hard drives) associated with VM's that are in use (or requested to be used).

FIGS. 4A-4D (collectively, "FIG. 4") are flow diagrams illustrating a method 400 for implementing VM management using hardware compression, in accordance with various embodiments. Method 400 of FIG. 4A continues onto FIG. 4C following the circular marker denoted, "A," or alternatively continues onto FIG. 4D following the circular marker denoted, "B."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, embodiments, or examples 100, 200, 300, and 300' of FIGS. 1, 2, 3A, and 3B, respectively (or components thereof), such methods may also be implemented using any suitable hardware (or software) implementation. Similarly, while each of the systems, embodiments, or examples 100, 200, 300, and 300' of FIGS. 1, 2, 3A, and 3B, respectively (or components thereof), can operate according to the method 400 illustrated by FIG. 4 (e.g., by executing instructions embodied on a computer readable medium), the systems, embodiments, or examples 100, 200, 300, and 300' of FIGS. 1, 2, 3A, and 3B can each also operate according to other modes of operation and/or perform other suitable procedures.

Figure 4A:
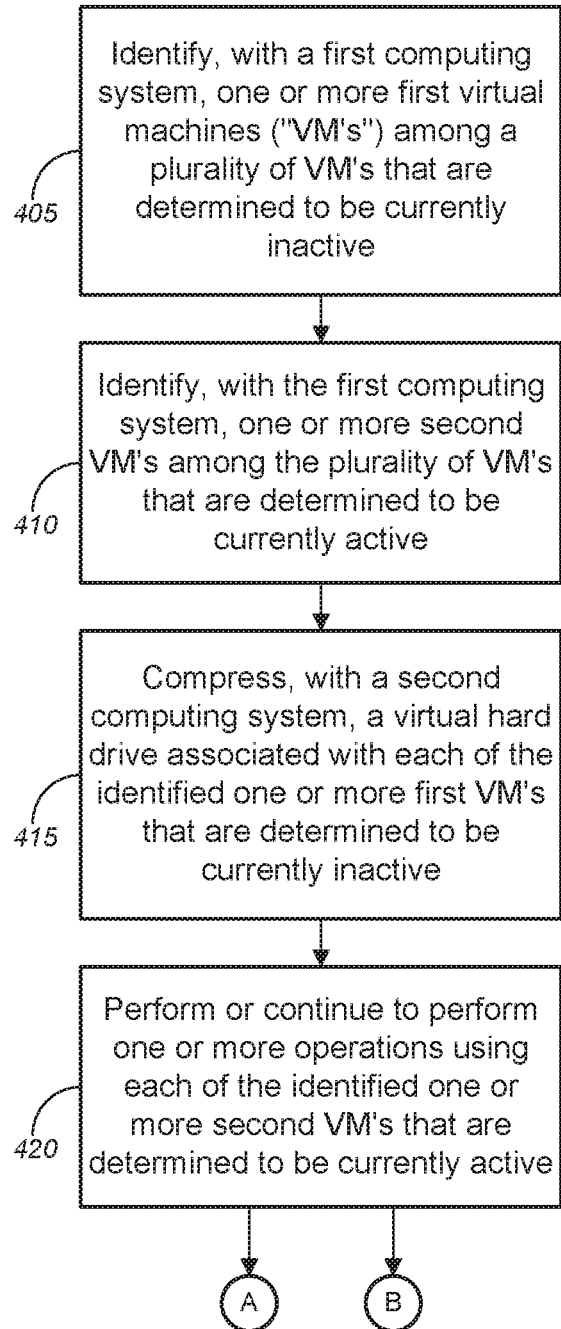
Figure 4B:
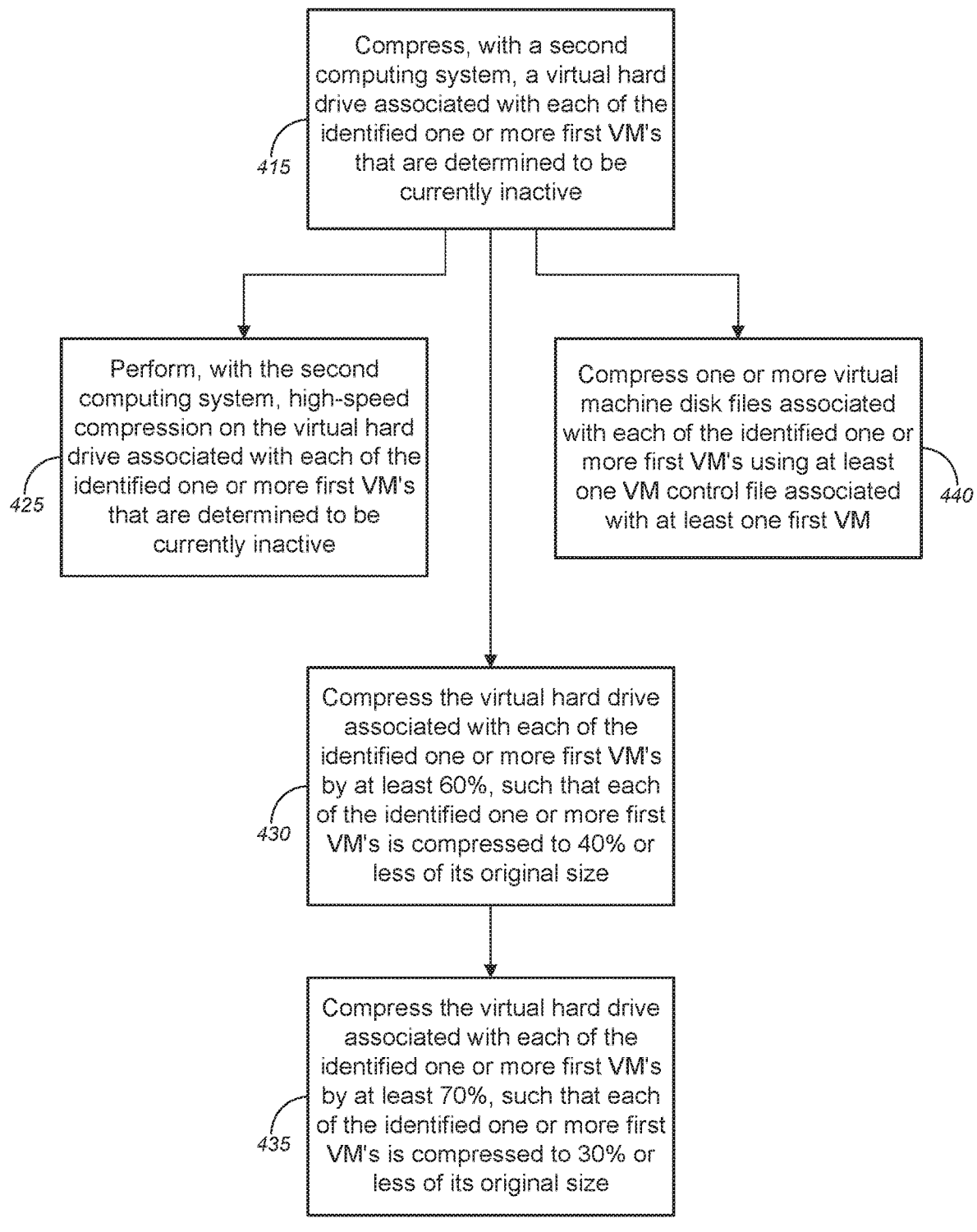

In the non-limiting embodiment of FIG. 4A, method 400 might comprise identifying, with a first computing system, one or more first virtual machines ("VM's") among a plurality of VM's that are determined to be currently inactive (block 405) and identifying, with the first computing system, one or more second VM's among the plurality of VM's that are determined to be currently active (block 410). Method 400, at block 415, might comprise compressing, with a second computing system, a virtual hard drive associated with each of the identified one or more first VM's that are determined to be currently inactive. At block 420, method 400 might comprise performing or continuing to perform one or more operations using each of the identified one or more second VM's that are determined to be currently active.

In some embodiments, the first computing system might include, without limitation, at least one of a hypervisor, a kernel-based VM server, a blade server, a central processing unit ("CPU"), a virtual processor, or a VM manager, and/or the like. In some cases, the second computing system might include, but is not limited to, at least one of a hypervisor, a compression processor, a compression computing system, a hardware compression board, a virtual processor, a graphic processing unit ("GPU")-based system, or a GPU-based board, and/or the like. In some instances, the first computing system and the second computing system are the same computing system With reference to FIG. 4B, compressing the virtual hard drive associated with each of the identified one or more first VM's (at block 415) might comprise performing, with the second computing system, high-speed compression on the virtual hard drive associated with each of the identified one or more first VM's that are determined to be currently inactive (block 425). Alternatively, or additionally, compressing the virtual hard drive associated with each of the identified one or more first VM's (at block 415) might comprise compressing the virtual hard drive associated with each of the identified one or more first VM's by at least 60%, such that each of the identified one or more first VM's is compressed to 40% or less of its original size (block 430). In some cases, compressing the virtual hard drive associated with each of the identified one or more first VM's (at block 415) might comprise compressing the virtual hard drive associated with each of the identified one or more first VM's by at least 70%, such that each of the identified one or more first VM's is compressed to 30% or less of its original size (block 435). Alternatively, or additionally, compressing the virtual hard drive associated with each of the identified one or more first VM's (at block 415) might comprise compressing one or more virtual machine disk files associated with each of the identified one or more first VM's using at least one VM control file associated with at least one first VM (block 440).

Turning back to FIG. 4A, method 400 might proceed from block 420, and either continue onto the process at block 445 in FIG. 4C following the circular marker denoted, "A" or continue onto the process at block 465 in FIG. 4D following the circular marker denoted, "B."

At block 445 in FIG. 4C (following the circular marker denoted, "A"), method 400 might comprise receiving, with the first computing system, a request to use at least one third VM among the one or more first VM's that are determined to be currently inactive. In some instances, receiving the request to use the at least one third VM (at block 445) might comprise receiving, with the first computing system, a request from a user to log into the at least one third VM (at optional block 450). At block 455, method 400 might comprise uncompressing, with the second computing system, a virtual hard drive associated with the at least one third VM. Method 400 might further comprise, at block 460, performing at least one operation using the at least one third VM after its virtual hard drive has been uncompressed.

At block 465 in FIG. 4D (following the circular marker denoted, "B"), method 400 might comprise creating one or more new VM's. Method 400 might further comprise managing existing VM's among the plurality of VM's and among the one or more new VM's (block 470) and logging into at least one of the managed VM's (block 475).

Exemplary System and Hardware Implementation

Figure 5:
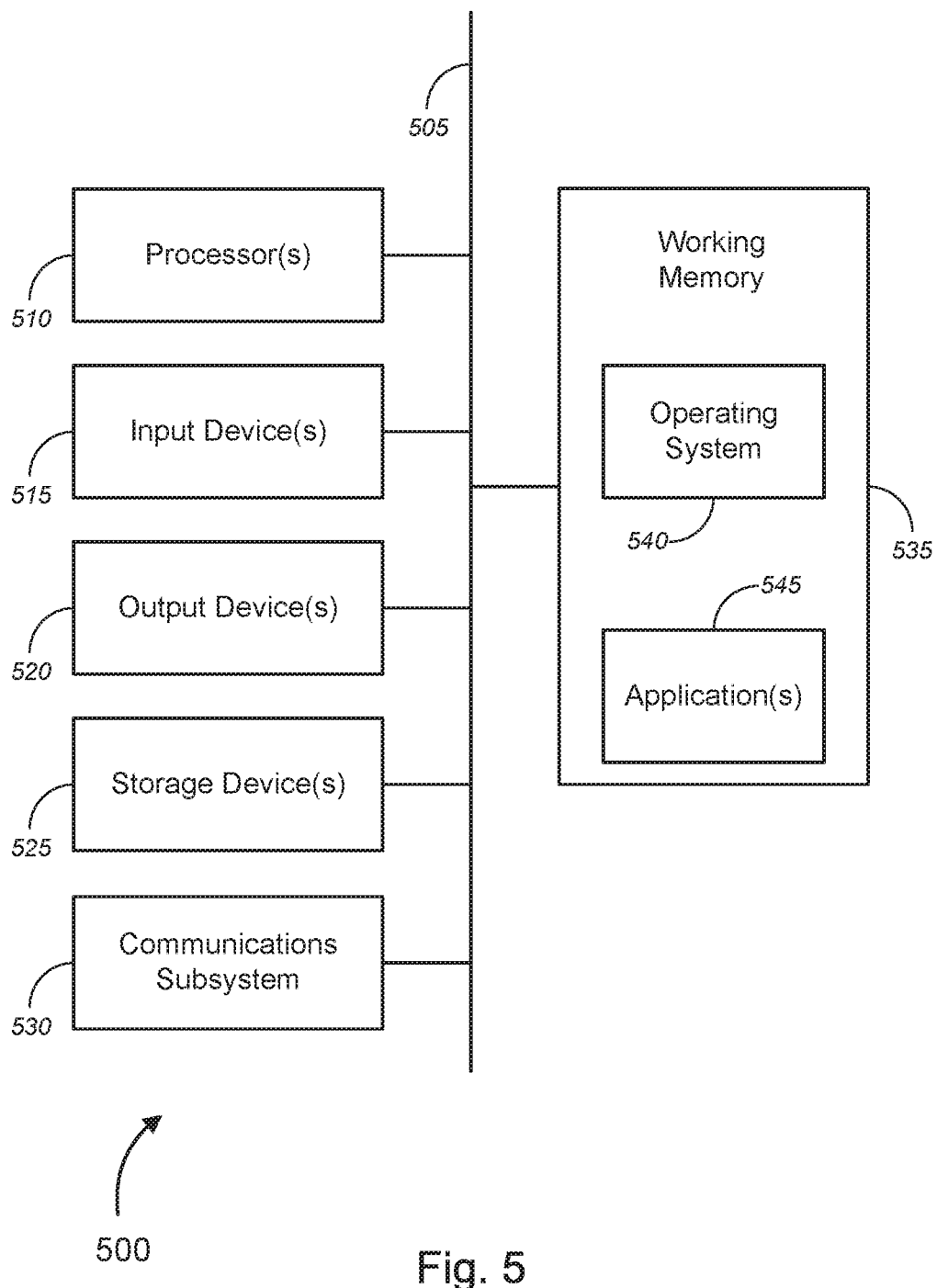
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems, hypervisor servers, or CPU's 105 or 210, blade server 205, VM's or KVM's 115, 230, 310, or 345, client 235, compression systems or compression board 140, 255, or 305, and remote computing system 150, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems, hypervisor servers, or CPU's 105 or 210, blade server 205, VM's or KVM's 115, 230, 310, or 345, client 235, compression systems or compression board 140, 255, or 305, and remote computing system 150, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
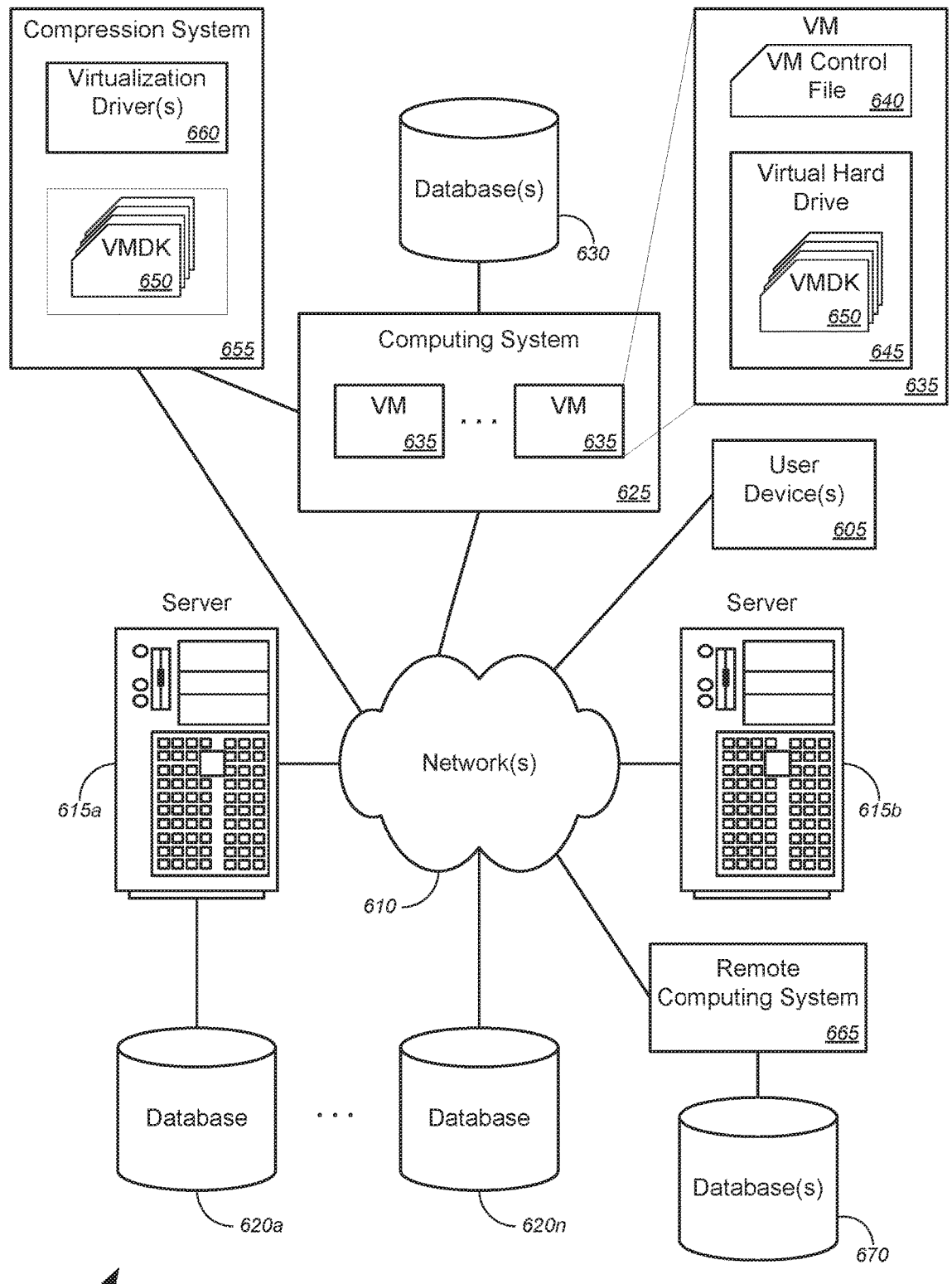
FIG. 6 is a block diagram illustrating a networked system of computers, computing systems, or system hardware architecture, which can be used in accordance with various embodiments.

As noted above, a set of embodiments comprises methods and systems for implementing virtual machine ("VM") management, and, more particularly, to methods, systems, and apparatuses for implementing VM management using hardware compression. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 120 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing virtual machine ("VM") management, and, more particularly, to methods, systems, and apparatuses for implementing VM management using hardware compression, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 and corresponding database(s) 630. In some embodiments, the computing system 625 might include, without limitation, at least one of a hypervisor, a kernel-based VM server, a blade server, a central processing unit ("CPU"), a virtual processor, or a VM manager a compression processor, a compression computing system, a hardware compression board, a graphic processing unit ("GPU")-based system, or a GPU-based board, and/or the like. System 600 might further comprise a plurality of VM's 635, which may be disposed (or hosted) within computing system 625 (depicted in FIG. 6), disposed external to (yet communicatively coupled with) computing system 625 (not shown), disposed within network(s) 610 with which computing system 625 is in communication (either wirelessly or in a wired manner) (not shown), and/or the like. In some instances, the computing system 625 might manage VM's. In some cases, the computing system 625 might be a server that runs a hypervisor that provides the ability to carve up hardware resources (e.g., CPU cores, processing memory (e.g., RAM), physical storage (hard drive space), and/or the like).

In some embodiments, one or more of the plurality of VM's 635 might comprise kernel-based VM's ("KVM's"), or the like. According to some embodiments, each of at least one VM among the plurality of VM's 635 might comprise a VM control file 640 (e.g., a .vmx file, or the like) and a virtual hard drive 645. In some cases, the VM control file 640 might be a primary configuration or control file that stores one or more settings for the VM (which may be based on input by a user, or may be based on default settings, or the like), while the virtual hard drive 645 might comprise one or more virtual disk files 650 (e.g., one or more .vmdk files, or the like) that store contents of the VM's hard drive 645. In some embodiments, the one or more virtual disk files 650 (e.g., the one or more .vmdk files, or the like) might each comprise an image of a VM associated therewith.

System 600 might further comprise a compression system 655, which might include, but is not limited to, at least one of a hypervisor, a compression processor, a compression computing system, a hardware compression board, a virtual processor, a graphic processing unit ("GPU")-based system, or a GPU-based board, and/or the like. In some embodiments, the computing system 625 and the compression system 655 might be embodied in the same computing system, or the like. In some instances, the compression system 655 might provide high-speed compression (and high-speed uncompression), which might offload compression (or uncompression) workload from at least one central processing unit ("CPU") of the computing system 625. In some cases, a virtualization driver(s) 660 (which might be disposed and installed on the compression system 655, or might be disposed and installed on another computer hardware or the like) might be configured to route disk input/output ("I/O") through the compression system 655. According to some embodiments, system 600 might further comprise remote computing system 665 and corresponding database(s) 670, which might perform functions similar to computing system 625, while being remotely located relatively to the plurality of VM's 635 and being communicatively coupled to the VM's 635 via network(s) 610.

In operation, the computing system 625 might identify one or more first VM's 635a (not shown in FIG. 6) among the plurality of VM's 635 that are determined to be currently inactive, and might identify one or more second VM's 635*b* (not shown in FIG. 6) among the plurality of VM's 635 that are determined to be currently active. The compression system 655 (or computing system 625) might compress the virtual hard drive 645 (specifically, one or more virtual disk files 650 of the virtual hard drive 645) associated with each of the identified one or more first VM's that are determined to be currently inactive (as depicted in FIG. 3A, or the like). In some cases, the computing system 625 (or another computing system) might perform or continue to perform one or more (computing) operations using each of the identified one or more second VM's 635*b* that are determined to be currently active.

In some embodiments, the computing system 625 might receive a request to use at least one third VM 635*c* (not shown) among the one or more first VM's 635*a* that are determined to be currently inactive. In some instances, receiving the request to use the at least one third VM 635*c* might comprise receiving a request from a user to log into the at least one third VM 635*c*. The compression system 655 (or computing system 625) might uncompress a virtual hard drive 645 (specifically, one or more virtual disk files 650 of the virtual hard drive 645) associated with the at least one third VM 635*c* (as depicted in FIG. 3B, or the like). In some cases, the computing system 625 (or another computing system) might perform at least one (computing) operation using the at least one third VM 635*c* after its virtual hard drive 645 (specifically, the one or more virtual disk files 650 of the virtual hard drive 645) has been uncompressed.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    identifying, with a first computing system, one or more first virtual machines ("VM's") among a plurality of VM's that are determined to be currently inactive;
    identifying, with the first computing system, one or more second VM's among the plurality of VM's that are determined to be currently active;
    compressing, with a second computing system, a virtual hard drive associated with each of the identified one or more first VM's that are determined to be currently inactive, wherein compressing the virtual hard drive associated with each of the identified one or more first VM's comprises performing, with the second computing system, high-speed compression on the virtual hard drive associated with each of the identified one or more first VM's that are determined to be currently inactive; and
    performing or continuing to perform one or more operations using each of the identified one or more second VM's that are determined to be currently active.

2. The method of claim 1, wherein the first computing system comprises at least one of a hypervisor, a kernel-based VM server, a blade server, a central processing unit ("CPU"), a virtual processor, or a VM manager.

3. The method of claim 1, wherein the second computing system comprises at least one of a hypervisor, a compression processor, a compression computing system, a hardware compression board, a virtual processor, a graphic processing unit ("GPU")-based system, or a GPU-based board.

4. The method of claim 1, wherein the first computing system and the second computing system are the same computing system.

5. The method of claim 1, wherein compressing the virtual hard drive associated with each of the identified one or more first VM's comprises compressing the virtual hard drive associated with each of the identified one or more first VM's by at least 60%, such that each of the identified one or more first VM's is compressed to 40% or less of its original size.

6. The method of claim 5, wherein compressing the virtual hard drive associated with each of the identified one or more first VM's comprises compressing the virtual hard drive associated with each of the identified one or more first VM's by at least 70%, such that each of the identified one or more first VM's is compressed to 30% or less of its original size.

7. The method of claim 1, wherein compressing the virtual hard drive associated with each of the identified one or more first VM's comprises compressing one or more virtual machine disk files associated with each of the identified one or more first VM's using at least one VM control file associated with at least one first VM.

8. The method of claim 1, further comprising:
    receiving, with the first computing system, a request to use at least one third VM among the one or more first VM's that are determined to be currently inactive;
    uncompressing, with the second computing system, a virtual hard drive associated with the at least one third VM; and
    performing at least one operation using the at least one third VM after its virtual hard drive has been uncompressed.

9. The method of claim 8, wherein receiving the request to use the at least one third VM comprises receiving, with the first computing system, a request from a user to log into the at least one third VM.

10. The method of claim 1, further comprising:
creating one or more new VM's;
managing existing VM's among the plurality of VM's and among the one or more new VM's; and
logging into at least one of the managed VM's.

11. A system, comprising:
a first computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the first computing system to:
identify one or more first virtual machines ("VM's") among a plurality of VM's that are determined to be currently inactive; and
identify one or more second VM's among the plurality of VM's that are determined to be currently active; and
a second computing system, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the second computing system to:
compress a virtual hard drive associated with each of the identified one or more first VM's that are determined to be currently inactive, wherein compressing the virtual hard drive associated with each of the identified one or more first VM's comprises performing high-speed compression on the virtual hard drive associated with each of the identified one or more first VM's that are determined to be currently inactive;
wherein the first set of instructions, when executed by the at least one first processor, further causes the first computing system to:
perform or continue to perform one or more operations using each of the identified one or more second VM's that are determined to be currently active.

12. The system of claim 11, wherein the first computing system comprises at least one of a hypervisor, a kernel-based VM server, a blade server, a central processing unit ("CPU"), a virtual processor, or a VM manager.

13. The system of claim 11, wherein the second computing system comprises at least one of a hypervisor, a compression processor, a compression computing system, a hardware compression board, a virtual processor, a graphic processing unit ("GPU")-based system, or a GPU-based board.

14. The system of claim 11, wherein the first computing system and the second computing system are the same computing system.

15. The system of claim 11, wherein compressing the virtual hard drive associated with each of the identified one or more first VM's comprises compressing one or more virtual machine disk files associated with each of the identified one or more first VM's using at least one VM control file associated with at least one first VM.

16. The system of claim 11, wherein:
the first set of instructions, when executed by the at least one first processor, further causes the first computing system to:
receive a request to use at least one third VM among the one or more first VM's that are determined to be currently inactive;
the second set of instructions, when executed by the at least one second processor, further causes the second computing system to:
uncompress a virtual hard drive associated with the at least one third VM; and
the first set of instructions, when executed by the at least one first processor, further causes the first computing system to:
perform at least one operation using the at least one third VM after its virtual hard drive has been uncompressed.

17. The system of claim 16, wherein receiving the request to use the at least one third VM comprises receiving a request from a user to log into the at least one third VM.

18. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
identify one or more first virtual machines ("VM's") among a plurality of VM's that are determined to be currently inactive;
identify one or more second VM's among the plurality of VM's that are determined to be currently active;
compress a virtual hard drive associated with each of the identified one or more first VM's that are determined to be currently inactive, wherein compressing the virtual hard drive associated with each of the identified one or more first VM's comprises performing high-speed compression on the virtual hard drive associated with each of the identified one or more first VM's that are determined to be currently inactive; and
perform or continue to perform one or more operations using each of the identified one or more second VM's that are determined to be currently active.

* * * * *